Patented Sept. 20, 1927.

1,642,884

UNITED STATES PATENT OFFICE.

CHARLES J. MEIER, OF LOUISVILLE, KENTUCKY.

SOLDERING FLUX.

No Drawing.  Application filed July 9, 1926. Serial No. 121,500.

The present invention relates to a soldering flux, of a novel composition, and which has the advantages that for ordinary soldering work it is more powerful than the fluxes ordinarily used in soldering, and due to the composition of the flux, it is suitable for use on soldering many materials to which ordinary solder does not readily adhere, or does not adhere strongly.

The flux is in the form of a liquid carrying pasty matter in suspension therein, and is preferably composed of the reaction products of the following substances, hydrochloric acid, zinc, ammonium hydroxide, ammonium chloride, spirits of turpentine, ethyl alcohol and bismuth subnitrate.

In preparing the flux the proportions of the materials can be varied more or less, but for producing the best results, the proportions should be substantially in accordance with the following example:—

8 ounces (about 240 grams) of metallic zinc of ordinary quality are added to 473 c.c. (or 567 grams) of hydrochloric acid of about 1.2 specific gravity, and allowed to dissolve therein. The solution is stirred from time to time if desired, although the evolution of hydrogen will ordinarily produce sufficient stirring of the reaction mixture. This forms an acid solution of zinc chloride. 158 c.c. (142 grams) of concentrated ammonia water (specific gravity about 0.9) are then added to this mixture, which makes the solution alkaline and causes more or less precipitation of zinc hydroxid in the solution, with the formation of ammonium chloride. A further quantity of ammonium chloride, say ½ an ounce (about 15 grams), is then added to the solution and stirred until dissolved. This amount is given by way of example. The ammonium chloride in the flux appears to act as an adhesive and also it removes dirt and rust or corrosion from the surface of the object to be soldered. The zinc hydroxide assists in the adhesion, and by subsequent reduction at the time of using the flux, a part of the same is reduced to metal, which makes the solder stick very much better to the metal being operated upon. The addition of the extra amount of ammonium chloride makes the solution slightly thicker in consistency, and increases the effectiveness of the flux.

2 c.c. of spirits of turpentine and 12 c.c. of ethyl alcohol (or denatured alcohol) are then added to the mixture and well stirred. The turpentine possesses certain resinous properties particularly after the same has stood for a considerable time, and assists in the reduction of the zinc hydroxide to metallic zinc, at the time of use of the flux.

The bismuth subnitrate, preferably about 2 ounces (say 60 grams) thereof, is then added and stirred up into the mixture. The small amount of bismuth compounds present, become partially reduced to metallic bismuth during the application of the hot molten solder or during the application of the soldering iron to the article being soldered, and this bismuth, together with the zinc make a much better union between the solder and the metallic article, and also make possible the application of solders to many substances to which ordinary solder will not stick, or will form a strong union.

It will be understood that the soldering flux can be made up in any desired amount and can be kept for a short or long time before using. The mixture should be shaken well before using, in order to completely emulsify the turpentine in the aqueous liquid, and the bottle containing the flux should be kept tightly corked, when not in use, to prevent evaporation of the turpentine, alcohol and water.

By the above process a flux is produced which is highly effective for any kind of soldering, and particularly for soldering metals to which solder does not attach itself readily, or does not produce a strong union.

Other salts of bismuth, such as the chloride or subchloride can be substituted, when available. If the normal chloride is to be employed, it is advisable to add a further 50 c.c. of the ammonia water, when the same is added.

I claim:—

1. A soldering flux comprising the reaction products of zinc with somewhat over double its weight of concentrated hydrochloric acid and with strong ammonia water sufficient to cause precipitation of some of the zinc in the form of basic compounds, with an amount of bismuth salt equal to about one-fourth the amount of the total zinc used, together with smaller but substantial amounts of ammonium chloride, alcohol and spirits of turpentine.

2. A soldering flux comprising the reaction products of the following materials, in about the quantities named, viz:—

| | |
|---|---|
| Zinc | 240 grs. |
| Hydrochloric acid (1.2 sp. gr.) | 567 grs. |
| Ammonia water (0.9 sp. gr.) | 142 grs. |
| Ammonium chloride | 15 grs. |
| Bismuth subnitrate | 60 grs. |
| Alcohol | 12 c.c. |
| Spirits of turpentine | 2 c.c. |

In testimony whereof I affix my signature.

CHARLES J. MEIER.